United States Patent
Fournier

[15] 3,658,190
[45] Apr. 25, 1972

[54] AUTOMATIC WORKPIECE LOADER AND UNLOADER

[72] Inventor: Roger H. Fournier, Millbury, Mass.
[73] Assignee: Norton Company, Worcester, Mass.
[22] Filed: Sept. 25, 1970
[21] Appl. No.: 75,450

[52] U.S. Cl..............................214/1 BB, 51/215 CP, 82/2.5
[51] Int. Cl......................................................B23b 13/02
[58] Field of Search..........................214/1 BB; 82/2.5, 2.7; 51/215 R, 215 UC, 215 CP, 215 H

[56] References Cited

UNITED STATES PATENTS

| | | | |
|---|---|---|---|
| 2,714,324 | 8/1955 | Dinsmore | 214/1 BB X |
| 2,927,703 | 3/1960 | Rainey | 214/1 BB |
| 3,204,782 | 9/1965 | Kendall | 214/1 BB |
| 3,371,953 | 3/1968 | Blatt | 294/115 X |
| 3,575,301 | 4/1971 | Panissidi | 214/147 T |

*Primary Examiner*—Gerald M. Forlenza
*Assistant Examiner*—George F. Abraham
*Attorney*—Lewis M. Smith, Jr.

[57] ABSTRACT

A workpiece loader and unloader for use in conjunction with a machine tool adapted to perform a machining operation on a workpiece. A workpiece loader and unloader includes a pair of extensible workpiece grasping members carried by a carriage assembly adapted to reciprocate between a first position over the machine tool and a second position over a workpiece conveying apparatus. One of the workpiece grasping members is utilized to grasp and unload finished workpieces from the machine after they have been machined and the other of the workpiece grasping members is adapted to grasp and load unfinished workpieces in the machine tool prior to the machining operation. The workpiece grasping member utilized to load an unfinished workpiece into the machine is extensible along a path intersecting and substantially perpendicular to the axis about which the workpiece is rotated in the machine and the workpiece grasping member utilized to unload a finished workpiece from the machine is extensible along a path which is angularly disposed with respect to the first-mentioned path so that when a workpiece loader and unloader are alternately extended the workpiece grasping member of each is extended to substantially the same point thereby to effect unloading and loading of the workpieces from and into the machine tool and the workpiece conveying apparatus.

4 Claims, 10 Drawing Figures

Patented April 25, 1972

INVENTOR.
ROGER H. FOURNIER

BY

ATTORNEY

INVENTOR.
ROGER H. FOURNIER

BY

ATTORNEY

INVENTOR.
ROGER H. FOURNIER

BY
*Lewis M. Smith Jr.*
ATTORNEY

Patented April 25, 1972

INVENTOR.
ROGER H. FOURNIER

BY *Lewis M. Smith, Jr.*

ATTORNEY

AUTOMATIC WORKPIECE LOADER AND UNLOADER

The present invention relates to workpiece loaders and unloaders for use in conjunction with machine tools and more particularly to an automatic workpiece transferring, loading and unloading apparatus for machine tool such as a grinding machine.

In production line machine tool operations, maximum efficiency and economy of operation results if the machine tool is operated automatically with little direct control, or dependence upon, manual labor for the loading and unloading of successive workpieces in the machine tool and if the machine tool is operated so as to maximize the machine tool usage by eliminating delays in the loading and unloading of workpieces therefrom. Ideally, maximum efficiency of operation is obtained if the loading and unloading of workpieces from the machine tool is accomplished in an automatic fashion in as short a time as is feasible in order to maximize the time in which the machine tool is performing the machining operation and minimize idle time while workpieces are loaded and unloaded from the machine tool.

Accordingly, it is an object of the present invention to provide an automatic workpiece loader and unloader for use in conjunction with a machine tool to maximize machine tool utilization.

It is another object of the present invention to provide an automatic workpiece loader and unloader which can remove a finished workpiece from a machine tool, load an unfinished workpiece therein, return the finished workpiece to a workpiece conveyor and retrieve an unfinished workpiece from the conveyor to be loaded in the machine tool.

Yet another object of the present invention is to provide an extensible workpiece loader and unloader mounted on a slide carriage which is reciprocable to pickup and deposit a workpiece at the same location on a workpiece conveyor and in a machine tool.

These and other objects of the present invention will be in part obvious and in part pointed out in the following specification and the accompanying drawings in which one of various possible embodiments of the present invention is illustrated.

In the preferred embodiment of the present invention a workpiece loader and unloader for use in conjunction with a machine tool such as a grinding machine is provided wherein a workpiece loader mechanism and a workpiece unloader mechanism are mounted on a reciprocable slide carriage adapted to reciprocate between a first position over the machine tool and a second position over a workpiece conveying apparatus. The workpiece loader and unloader mechanisms include means to grasp and retain a workpiece therein and are extensible from the carriage assembly so that the grasping member moves into contact with the workpiece to be grasped and then is retracted after a workpiece is grasped.

During a cycle of operation, the slide carriage is reciprocated to a first position over the workpiece conveying apparatus, the workpiece loader mechanism is extended and a workpiece upon which a machining operation is to be performed is grasped by the loader mechanism. The loader mechanism is retracted and the slide carriage is reciprocated to a predetermined second position over the machine tool. The unloader mechanism is now extended to grasp the workpiece in the machine tool which has been machined and is retracted to unload the machine tool. The loader mechanism is now extended to load the new workpiece in the machine tool and after the loader mechanism has been retracted, the carriage is reciprocated into position over the conveying apparatus so an unfinished workpiece may be picked up by the loader mechanism and a finished workpiece may be deposited upon the conveying apparatus. Thus, when the apparatus is functioning in full cycle, a workpiece is unloaded from the machine tool by the unloader mechanism and a new workpiece is immediately loaded in the machine by the loader mechanism so that the machine tool is operating for a maximum period of time with little or no delay between loading and unloading of subsequent workpieces.

Figure 1:
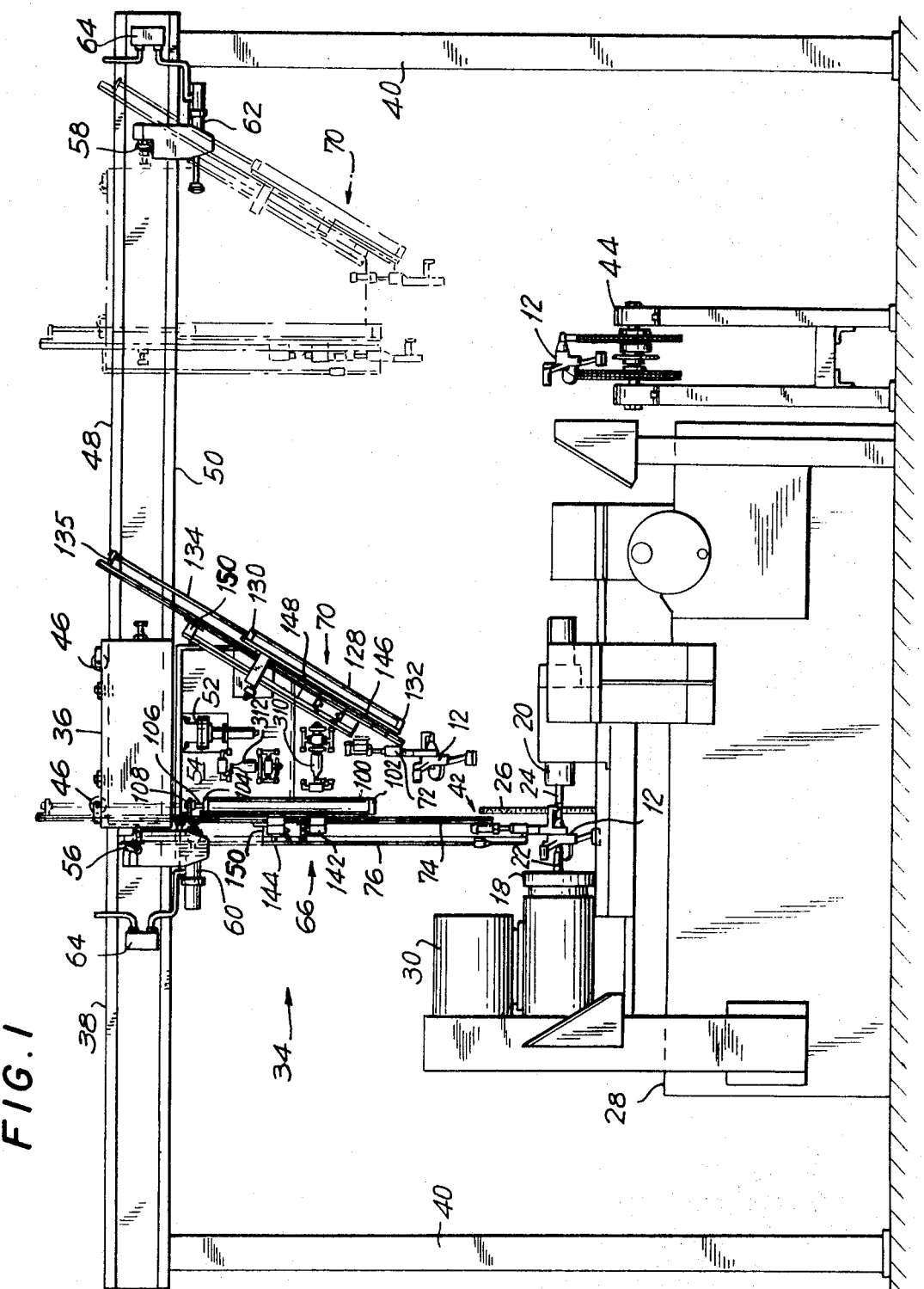
FIG. 1 is an elevational view of a machine tool such as a grinding machine showing a reciprocable and extensible workpiece loader and unloader of the present invention.

With reference now to the drawings and particularly FIG. 1, there is shown a machine tool such as a grinding machine 10 which, illustratively, is adapted to perform a grinding operation on a relatively short and relatively large diameter workpiece such as an automobile steering knuckle 12 and which includes a headstock assembly 18 and a tailstock assembly 20, respectively, supporting axially aligned workpiece centers 22 and 24, respectively, which in turn support opposite ends of the steering knuckle 12 to be ground by grinding wheel 26. Grinding machine 10 is supported on a suitable base 28 and is provided with a motor 30 to rotate the workpiece centers 22 and 24 and a motor (not shown) to rotatably drive the grinding wheel 26. While the machine tool 10 has been illustrated as being a grinding machine to grind a workpiece such as a steering knuckle 12, it is to be understood that any type of machine tool to perform any repetitive machining operation an any type of workpiece may also be employed and, also, grinding machines of different construction than the one illustrated in FIG. 1 may also be utilized.

Associated with the grinding machine 10 is the workpiece loader and unloader assembly 34 which is carried by a slide carriage 36 slidably mounted on an overhead guide rail 38. Guide rail 38 is supported at each end on vertical support members 40 and the slide carriage 36 is reciprocable between a first station over a workpiece feed conveyor apparatus 44 as shown by the broken line position in FIG. 1, and a second workpiece loading station over a grinding machine 10.

Slide carriage 36 is provided with a set of upper wheels 46 and lower wheels (not shown) which are adapted to ride along the upper surface 48 and lower surface 50 of guide rail 38, respectively, with both sets of wheels being rotatably affixed to slide carriage 36. Slide carriage 36 is reciprocably moved along guide rail 38 by a reversible air motor 52 mounted on a support plate 54 depending from the slide carriage 36. Pressurized air is supplied to air motor 52 from an air supply line (not shown) through suitable control valves (not shown) and the air motor 52 includes rotative means operatively associated with guide rail 38 to reciprocably move the slide carriage 36 along guide rail 38. Appropriate limit switches 56 and 58 are provided in the path of travel of the slide carriage 36 to limit movement of the slide carriage and air-hydraulic shock absorbers 60 and 62 are provided mounted on the lower side of guide rail 38 to cushion the shock of stopping the slide carriage at each end of its path of travel. Each shock absorber is supplied with air and hydraulic fluid from an air-oil flow control tank 64.

The workpiece loader and unloader assembly 34 of the present invention is mounted to the depending support plate 54 of slide carriage 36 and includes a work loader assembly 66 including a workpiece grasping assembly 68 adapted to extend and retract along a path of movement substantially perpendicular to the axis of rotation of the workpiece and a workpiece unloader assembly 70 having a workpiece grasping assembly 72 adapted to extend and retract along a path angularly disposed with respect to the path of extension and retraction of the workpiece loader 66 in a common plane of reference intersecting the axis of rotation of the workpiece. The angular disposition of the unloader assembly 70 and the limit of extension of the loader 66 and unloader 70 is chosen so that both the grasping assemblies 68 and 72 extend to the same point at load station 42 and over conveyor apparatus 44 to permit loading and unloading of a workpiece. In this manner, both the workpiece loader 66 and the workpiece unloader 72, when fully extended can load and unload a workpiece from a common position in the machine tool 10 and on conveyor apparatus 44.

This common plane of reference may be vertical, provided there is sufficient clearance above the machine tool for unloading and loading a given workpiece, but, if necessary, to provide sufficient clearance between the machine tool and the workpieces being loaded and unloaded, this plane of reference may be displaced angularly away from the upper part of the machine tool, for example 25° to 30° from vertical toward the machine operator's station in front of the machine tool.

Figure 7:
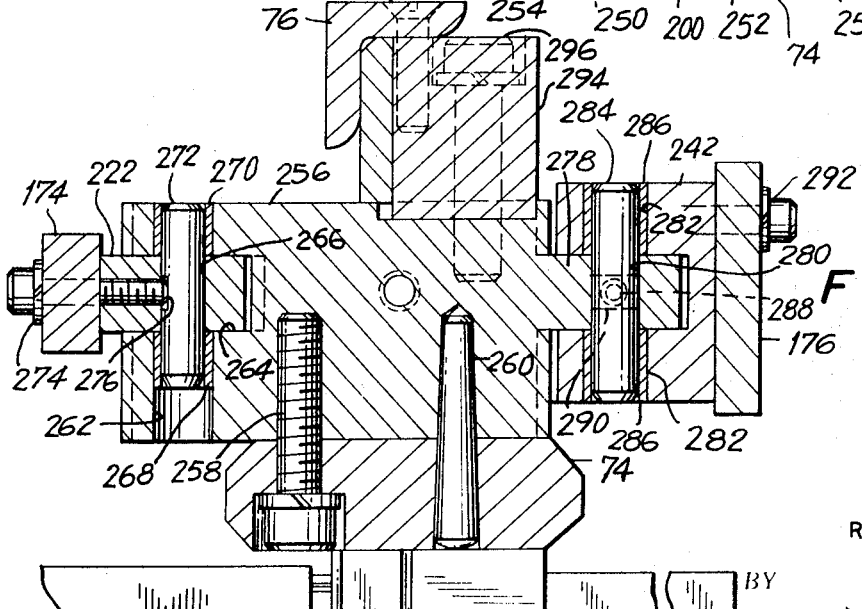
FIG. 7 is a sectional view taken on the line 7—7 of FIG. 3.

The loader assembly 66 includes an extensible and retractable slide carriage comprising an elongated slide member 74 and a spaced elongated stabilizer member 76 with the upper end of stabilizer member 76 being connected to an intermediate portion of slide member 74 by the actuating dog 150 for limit switch 144. The frame member 76 is also connected to slide member 74 by the actuating dog 150 for limit switch 142. In addition, as shown in FIG. 7, the lower end of stabilizer member 76 supports a spacer block 294 connected to a link member 256 in turn secured to the lower end of the slide member 74. An elongated support frame 88 is provided substantially parallel to, and closely adjacent, slide member 74 with support frame 88 being rigidly secured to depending support plate 54.

Rotatably mounted at the upper and lower ends of the support frame 88 are opposed pairs of V-grooved guide rollers 90 which are journaled on shaft members 92 mounted upon the support frame 88 and having enlarged circular heads 94. The V-grooved portion 96 of guide rollers 90 coact with the truncated side portions 98 of slide member 74 to retain the slide member 74 between the opposed pairs of guide rollers 90 and yet permit slide member 74 to reciprocably slide between the guide rollers 90.

Figure 5:
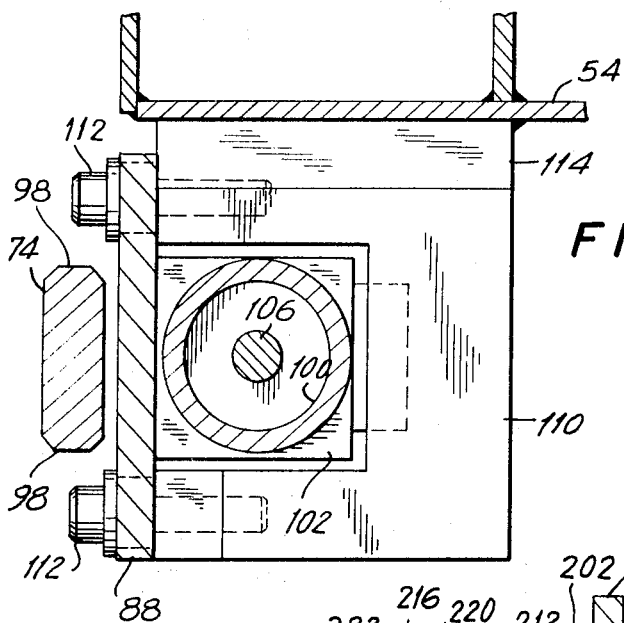
FIG. 5 is a sectional view taken on the line 5—5 of FIG. 2.

Movement of slide member 74 is responsive to actuation of a pneumatic cylinder 100 including square lower and upper end portions 102 and 104 attached to support frame 88. The pneumatic cylinder 100 is provided with an extension rod 106 which is attached at its lower end to the working piston member (not shown) of cylinder 100 and at its upper end by a bracket connection 108 to the upper end of slide member 74. Thus, as cylinder 100 is actuated, the working piston member and extension rod 106 extend and retract to reciprocate the slide member 74 and the workpiece grasping assembly 68 carried by the lower end of slide member 74. Reference is also made to FIG. 5 as well where it is seen that support frame 88 is rigidly connected to a U-shaped leg of a mounting bracket 110, for example by suitable bolts 112, the mounting bracket 110 also including a leg 114 secured, for example by welding, to support plate 54.

Figure 4:
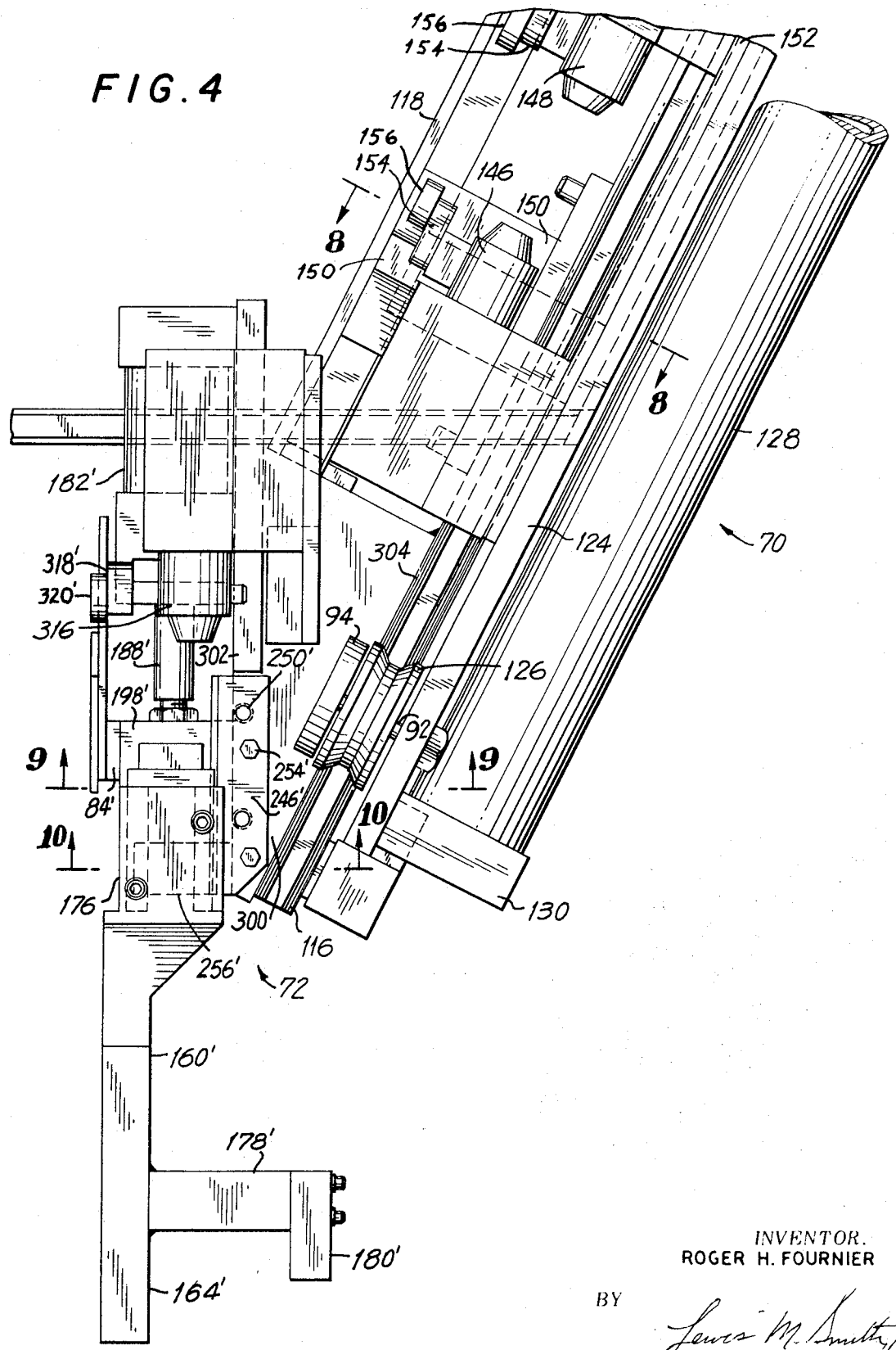
FIG. 4 is an elevational view of the workpiece unloader of the present invention.

Reference is now made to FIG. 4 for details of the lower end of the unloader assembly 70 and it is seen that the unloading assembly also includes a slide member 116 similar to the slide member 74 of the loading assembly and a spaced stabilizer member 118 connected to slide member 116 at the upper end of the stabilizer member 118 by the actuating dog 150 for limit switch 148 and at the lower end by an angled bracket plate 300. Slide member 116 and stabilizing member 118 are also interconnected by actuating dog 150 for limit switch 146. A support frame 124 is provided secured to support plate 54 and opposed pairs of upper and lower V-grooved guide rollers 126 are rotatably mounted on support frame 124 to slidably retain and guide slide member 116 therebetween. Support frame 124 has secured thereto a pneumatic cylinder 128 which is supported thereon by attachment of its upper end portion 130 and its lower end portion 132.

Pneumatic cylinder 128 includes a working piston member (not shown) and an extension rod 134 connected at its lower end to the working piston member of pneumatic cylinder 128 and at its upper end by a bracket connection 135 to the upper end of slide member 116. Thus, as cylinder 128 is actuated, extension rod 134 is reciprocated to reciprocably move slide member 116 and workpiece grasping assembly 72 carried by the lower end of slide member 116.

Figure 8:
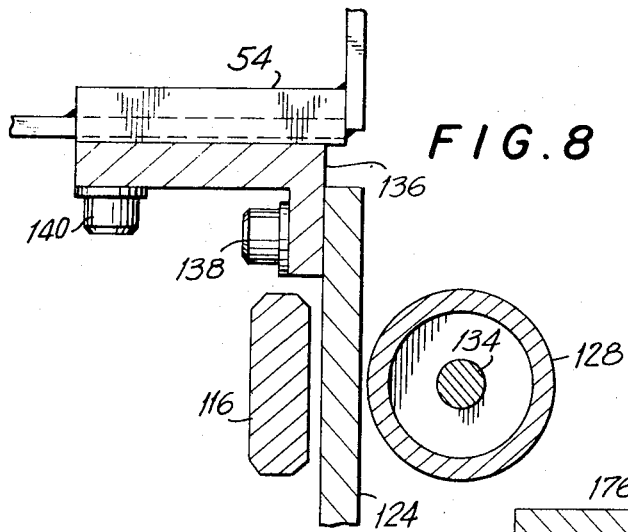
FIG. 8 is a sectional view taken on the line 8—8 of FIG. 4.

As best seen in FIG. 8, support frame 124 is secured to a pivotally adjustable L-shaped bracket member 136 by bolts 138 and bracket member 136 is fixed to support plate 54 by bolts 140.

The extension of the workpiece loader assembly 66 and unloader assembly 70 is controlled by valve means (not shown) which control the operation of the respective pneumatic cylinders 100 and 128. The respective extended positions of loader assembly 66 and unloader assembly 70 are precisely determined by adjustment of the extension rod 106 interconnecting slide member 74 and pneumatic cylinder 100 and extension rod 134 interconnecting slide member 116 and pneumatic cylinder 128. The distances between extended and retracted positions are determined by the length of the strokes of the working piston members within the respective pneumatic cylinders 100 and 128, in turn determining the respective retracted positions of the workpiece loader assembly 66 and unloader assembly 70.

A pair of limit switch assemblies 142, 144 and 146, 148 are respectively provided for the loader assembly and unloader assembly to sense the completion of the extension and/or retraction of the loader and unloader. Each limit switch 142-148 is rigidly secured to a respective support frame member 88 or 124 and includes a pivoting lever arm 154 having a roller member 156 rotatably secured to its outer end. The roller members 156 are adapted to contact a pair of spaced actuating dogs 150 on each respective slide member 74 and 116. The actuating dogs are plate members having converging inclined bearing surfaces which contact the roller member 156 of each limit switch assembly and cause the respective lever arm 154 to pivot to actuate the limit switch.

The respective extended and retracted positions having been so determined, the respective limit switch actuating dogs are so positioned and secured to the respective slide members and stabilizing members that they actuate the limit switches 142 and 146 when the loader and unloader assemblies reach their retracted positions and actuate the limit switches 144 and 148 when the loader and unloader assemblies reach their extended positions.

Reference is now made to FIGS. 2, 3, 6 and 7 for details of the workpiece grasping assembly 68 which is carried by the lower end of the slide member 74. The workpiece grasping assembly 68 includes a single pair of workpiece grasping arms 158 and 160 each respectively having a lower jaw portion 162 and 164 connected to a straight shank portion 166 and 168 then to an outwardly offset segment 170 and 172 and terminating in a straight leg segment 174 and 176. The straight leg segments are in turn mounted to pivot blocks carried by slide member 74 so that the pivot blocks cause the jaws 162 and 164 to move from an open position to a closed position thereby to grasp and retain the workpiece such as the steering knuckle 12 therein. Each of the grasping arms also include an extension member 178 extending rearwardly from the shank portion 166 and 168, respectively, with each extension member 178 supporting depending auxiliary jaws 180 adapted to grasp and retain a second portion of the workpiece in order to insure a positive grasp of the workpiece and to balance the workpiece within the grasping assembly.

Jaws 162 and 164 are opened and closed responsive to actuation of a pneumatic cylinder 182 (see FIG. 2) which is mounted by support bracket 184 to slide member 74. Pneumatic cylinder 182 includes an extension element 188 of the working piston member of the cylinder which is threadably engaged with sliding block 198 to which actuating dog 84 for limit which 314 is secured. Dowel 192 is journaled within sleeve bushings 194 and 196 and secured by the inner end of a bolt 190 engaging a cutout 212 in dowel 192. A pair of spaced link arms 202 and 204 are provided with each link arm having a through bore 206 and 208, respectively, at one end to accommodate dowel 192 and bushings 194 and 196 therethrough. A central link arm 210 is disposed between the spaced link arms 202 and 204 and link arm 210. The other ends of link arms 202 and 204 are respectively provided with a through bore 212 and 214 to house sleeve bushings 216 and 218 and a dowel 220 is journaled within bushings 216 and 218. A pivot block 222 is provided between the spaced link arms 202 and 204 and includes a through bore 224 to accommodate dowel 220 therethrough. The straight leg segment 174 of the workpiece grasping arm 158 is secured to pivot block 222, for example by a bolt 226 which has its end 228 disposed within a cutout 230 of the dowel 220 in order to prevent the dowel from being removed from pivot block 222.

In like manner, the other end of link arm 210 includes a bore 232 therethrough to accommodate a dowel 234 which is journaled within sleeve bushings 236 and 238 housed within a through bore 240 through the leg segments 241 of U-shaped pivot block 242. The straight leg segment 176 of workpiece grasping arm 160, which segment is wider than segment 174 of workpiece grasping arm 158, is secured to pivot block 242 by bolt 244.

Figure 2:
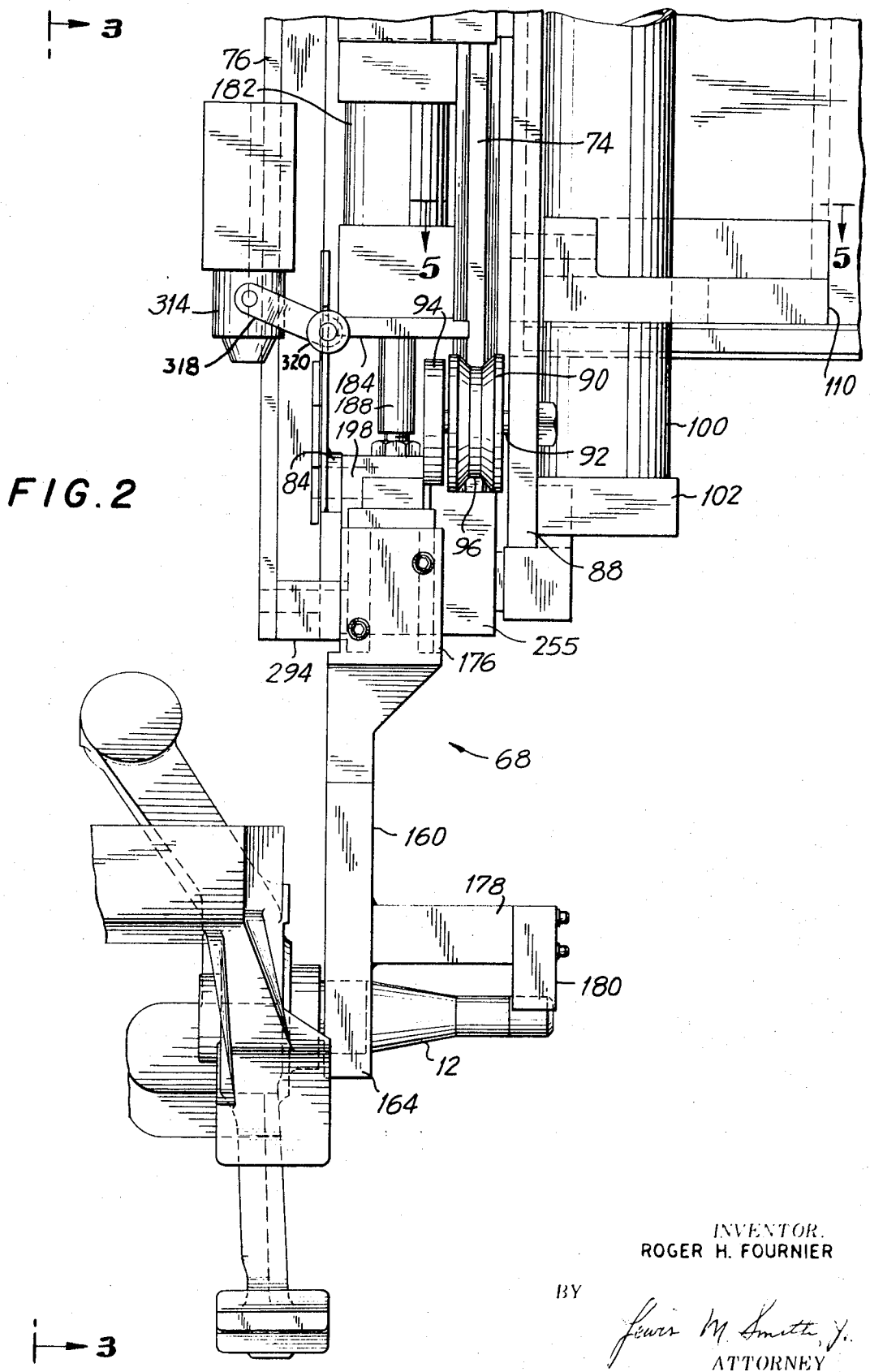
FIG. 2 is an elevational view on an enlarged scale of the lower portion of the workpiece loader of the present invention.
Figure 3:
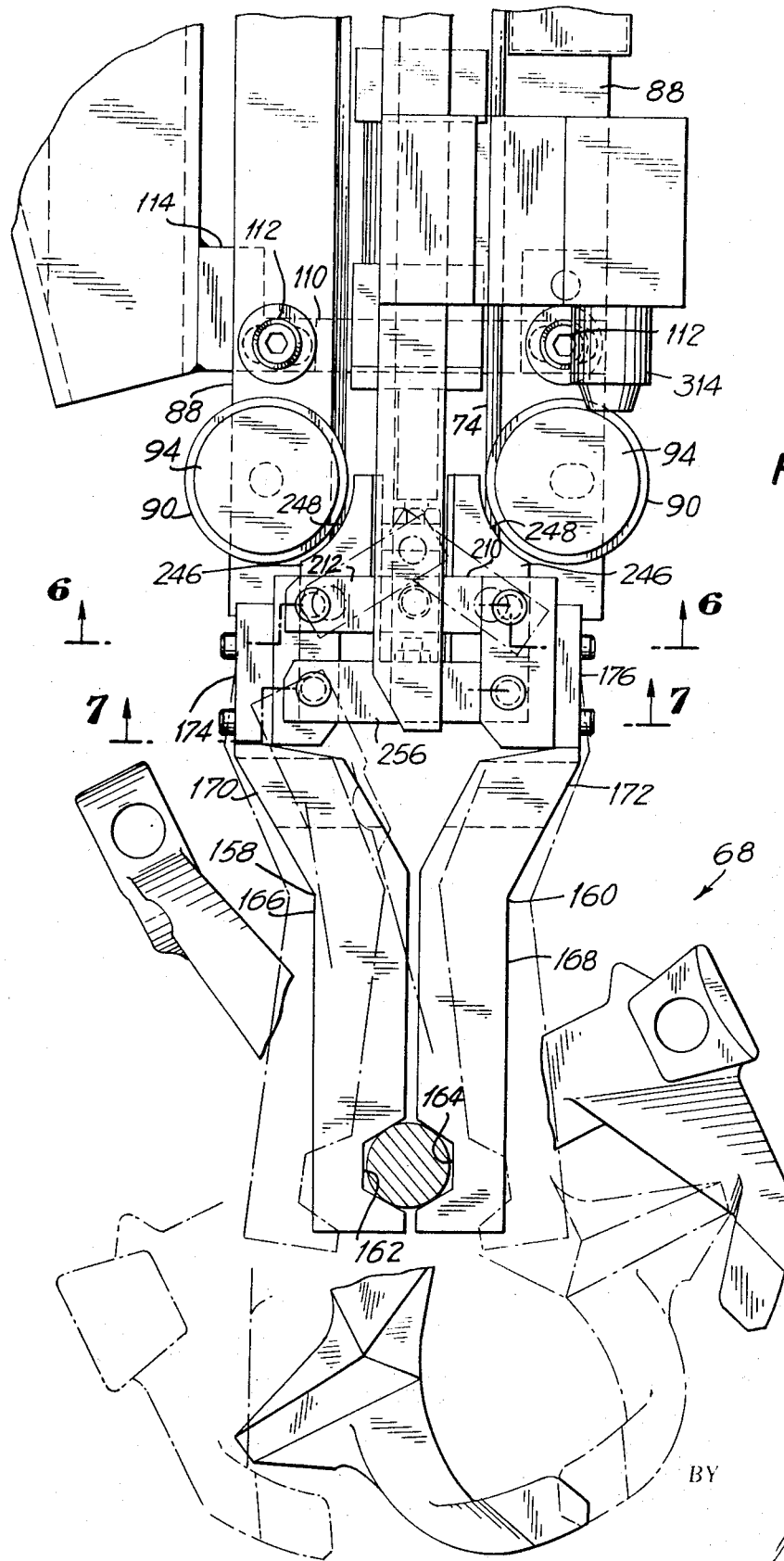
FIG. 3 is an elevational view taken on the line 3—3 of FIG. 2.

Thus, as cylinder 182 is actuated, the extension member 188 reciprocates vertically, as viewed in FIG. 2, causing the innermost ends of link arms 202, 204 and 210 to move with sliding block 198 between the full line position shown in FIG. 3 to the broken line position wherein the innermost ends of the link arms are elevated with respect to their outermost ends. This upward movement of the innermost ends of link arms 202, 204 and 210 draws the outermost ends of the link arms inwardly and, as the outermost ends of the link arms are retained within pivot blocks 222 and 242, the pivot blocks are also drawn inwardly to draw the upper ends of the straight leg segments 174 and 176 of the workpiece grasping arms inwardly.

Figure 6:
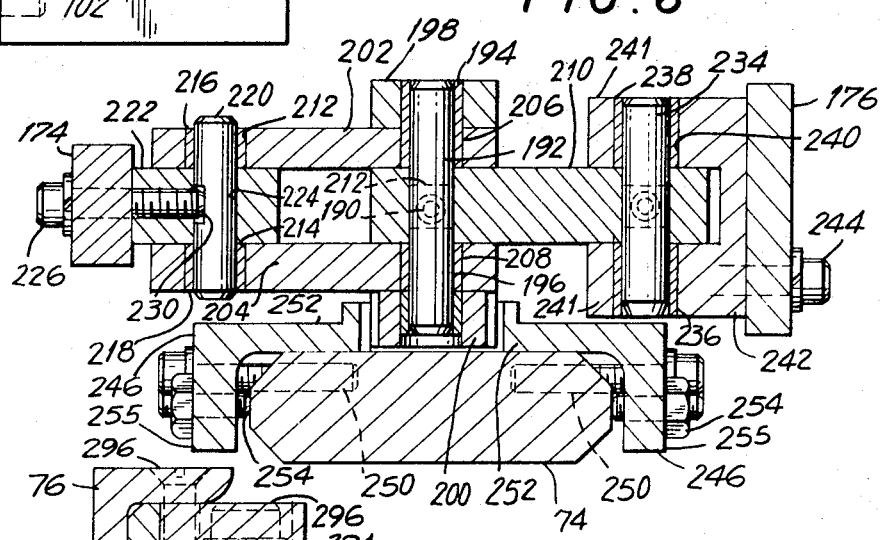
FIG. 6 is a sectional view taken on the line 6—6 of FIG. 3.

With reference to FIGS. 3 and 6, a pair of L-shaped bracket plates 246 are provided on each side of slide member 74. The upper outer edges of bracket plates 246 are arcuately contoured, as at 248, to provide clearance for rotating guide rollers 90 and the plates are secured to slide member 74, for example by bolts 250. The leg segments 252 of the plates are spaced from the roller 200 on dowel 194 by stop screws 254 through leg segments 255 and abutting slide member 74 to provide a clearance for the vertical movement of sliding block 198.

With reference now to FIG. 7, which is a cross-sectional view similar to FIG. 6 taken slightly below the section of FIG. 6, it is seen that a rigid link member 256 is provided which is fixed to slide member 74 by a threaded bolt 258 and a tapered dowel 260 to securely fasten and locate link member 256 on slide member 74. Link member 256 includes a through bore 262 in one end and has a transverse cutout 264 which intersects through bore 262. The pivot block 222 is slidably disposed within the cutout 264 and includes a through bore 266 which is in register with the through bore 262 of link member 256. Bushings 268 and 270 are provided in through bore 262 on each side of pivot block 222 and a dowel 272 is inserted therethrough to pivotally retain pivot block 222 within cutout 264 of link member 256. Leg segment 174 of workpiece grasping arm 158 is secured to pivot block 222 by a second bolt 274 which has its end disposed within a cutout 276 of dowel 272 to retain the dowel within pivot block 222 and prevent its displacement. By this arrangement, the pivot block 222 is pivotally secured to the link member 256 to allow the pivot block to pivot about the longitudinal axis of dowel 272.

The other end of link member 256 includes an extending ear 278 which is slidably disposed between the leg segments 241 of pivot block 242. A through bore 280 is provided in ear 278 in register with through bores 282 in leg segments 241 of pivot block 242 and a dowel 284 is journaled within bore 280 and within sleeve bushings 286 housed in through bores 282. A stop bolt 288 is provided through the underside of pivot block 242 with its end disposed within a cutout 290 in dowel 284 to prevent lateral displacement of the dowel and the straight leg segment 176 of workpiece grasping arm 160 is fixed to pivot block 242 by a second bolt 292.

A spacer block 294 is provided fixed to link member 256 by a bolt 296 to mount the stabilizer 76 thereto, for example by a threaded bolt 296.

Thus, it is seen that the pivot blocks 242 and 222 are rotatably disposed about dowels 272 and 284 but are fixed with respect to lateral displacement about these dowels by rigid link member 256. The upper ends of pivot blocks 222 and 242 are also rotatably disposed about dowels 220 and 234 and are interconnected by separate link arms 202, 204 and 210 which are rotatably disposed about dowel 194. As dowel 194 is vertically displaced by actuation of cylinder 182, the pivot blocks 222 and 242 pivot about the axis of dowels 220 and 234 and as dowels 220 and 234 are laterally displaced, the upper ends of pivot blocks 222 and 242 are also laterally displaced and the pivot blocks pivot about the longitudinal axis of dowel 272 and 284. In this manner, the workpiece grasping arms are pivoted to effect an opening and closing of the grasping jaws.

Figure 9:
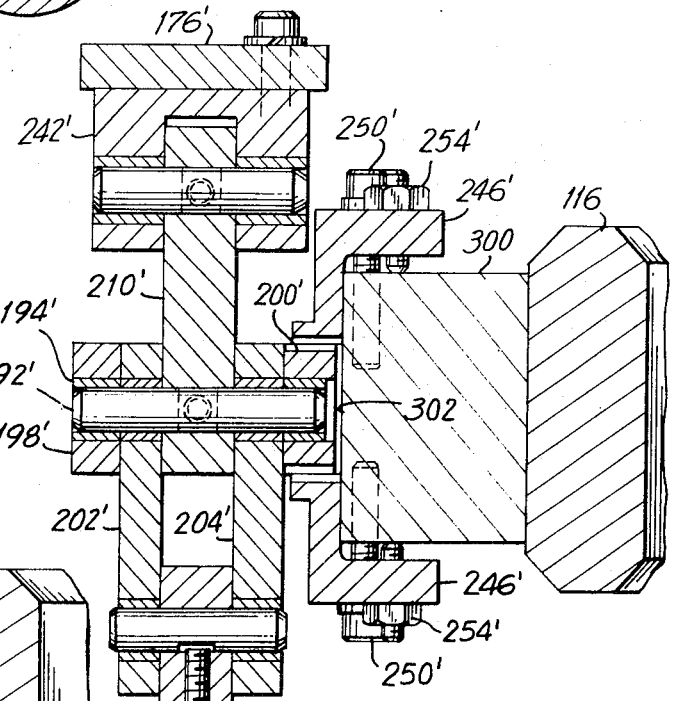
FIG. 9 is a sectional view taken on the line 9—9 of FIG. 4.
Figure 10:
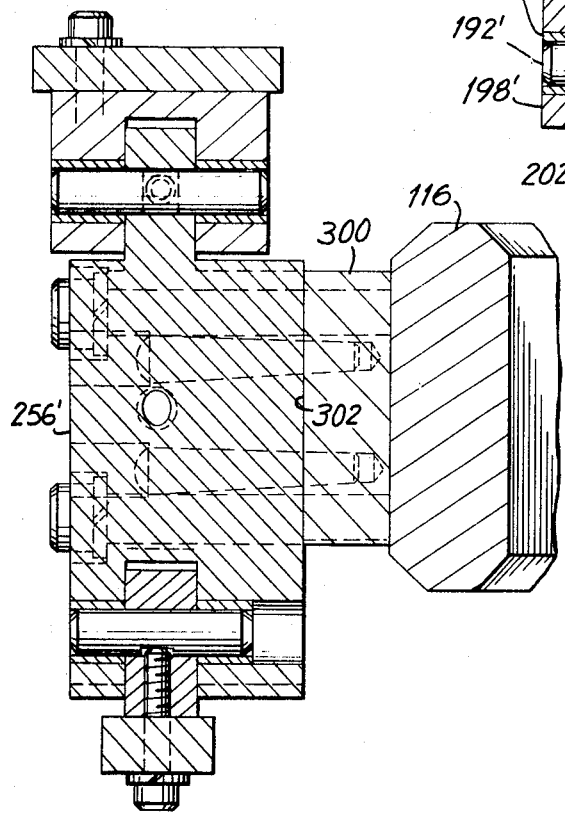
FIG. 10 is a sectional view taken on the line 10—10 of FIG. 4.

Reference is now made to FIGS. 4, 9 and 10 for details of the workpiece grasping assembly 72 on the workpiece unloader assembly 70 which, as indicated above, is extensible and retractable along a path angularly disposed with respect to the substantially perpendicular path of extension and retraction of the workpiece loader assembly. The workpiece grasping assembly 72 is constructed substantially identical to the workpiece grasping assembly 68 and the only modification between the two assemblies is that necessary to orient the workpiece grasping assembly 72 vertically with respect to the angularly disposed slide member 116. Accordingly, in FIGS. 4, 9 and 10 similar parts which function in a similar manner have been designated by the same numeral primed.

As best seen in FIG. 4, the lower end of slide member 116 has secured thereto an angled bracket plate 300 which has a vertical edge 302 and an opposed angled edge 304 to fit flush against the outer face of slide member 116. The workpiece grasping assembly 72 is mounted on the vertical edge 302 of bracket plate 300, for example by an L-shaped bracket 246' which brackets are an extension of the lower rigid link member 256'. In all other respects, the structure and operation of the workpiece grasping assembly 72 is identical to the workpiece grasping assembly 68 with pneumatic cylinder 182' controlling the pivoting of link members 202', 204' and 210' by reciprocating extension member 188' and sliding block 198', in order to pivot the grasping arms 158', 160' to an open and closed position so that the respective jaw members may be engaged about a workpiece. The actuating dog assembly for limit switch 316 is secured to slide block 198'.

After the machining operation is completed, the workpiece unloader assembly 72 is extended with the jaws open until the grasping jaws contact the workpiece in the machine tool, the jaws are then closed to firmly grasp the workpiece and the unloader assembly is retracted taking the completed workpiece therewith. As soon as the workpiece unloader begins to retract the workpiece loader assembly 68 is extended to deposit the next workpiece to be machined into the grinding machine 10. The slide carriage is then reciprocated to the broken line position shown in FIG. 1 over conveying apparatus 44 where the loader assembly is extended until the open jaws of the loader workpiece grasping assembly contact the next workpiece 12 on the conveying apparatus, the jaws are then closed and the loader assembly is retracted. After the grasping jaws are closed and the assembly retracted, the unloader assembly is then extended and the unloader jaws opened to deposit the machined workpiece on conveying apparatus 44. The unloader assembly is then retracted and slide carriage 36 is reciprocated to the load station 42 over the machine tool 10 to await completion of the machining operation on the workpiece in machine tool 10.

In this manner, workpieces are loaded and unloaded from the grinding machine with a minimum of machine idle time to maximize machine utilization and also to permit automatic operation of the machine tool for greatest economic efficiency.

A suitable control circuit (not shown) is provided to actuate the various pneumatic cylinders and air motor 52 in the proper sequence through air flow control valves 310 and 312 mounted on support plate 54 and adapted to provide a controlled flow of air under pressure to the various pneumatic cylinders. LImit switch assemblies 314, 316 are also provided responsive to cylinders 182 and 182' of the workpiece grasping assemblies and are integrated in the control circuitry along with the limit switches on the respective slide members and frame members to insure the proper predetermined sequence of operation. Limit switches 314 and 316 are similar to limit switches 142–148 and include lever arms 318, 318' and roller members 320 and 320', respectively, which are actuated by the respective actuating dogs 84, 84' when the assemblies 68 and 72 are extended and retracted by pneumatic cylinders 182 and 182', respectively. In fully automatic operation, initiation of the workpiece unload and load is responsive to the sensed completion of the grinding operation in grinding machine 10 so that no direct manual control is necessary.

As illustrated, the loader assembly is extensible and retractable on a path which is perpendicular to the axis about which the workpiece is rotated during the grinding operation and the workpiece unloader is extensible and retractable in the same plane along a path angularly disposed with respect to the path of movement of the loader assembly and converging with the path of movement followed by the loader assembly at the point where the workpiece is loaded into the machine tool and deposited on the workpiece conveying apparatus. This orientation for the workpiece loader and unloader assemblies offers a relatively simple and compact arrangement for loading and unloading a relatively short and relatively large diameter workpiece without interference between the workpieces, the associated slide carriages for the workpiece loader and unloader and the adjacent components of the grinding machine, since when a grinding operation is to be carried out on a relatively short workpiece, the headstock and tailstock assemblies are located necessarily relatively close to one another to receive and support the relatively short workpieces within the grinding machine. When the size and shape of the workpiece and/or the configuration of the machine tool so requires, the respective paths of the workpiece loader assembly and the workpiece unloader assembly in their common plane of reference may both be offset angularly either at the same angle or at different angles from a plane perpendicular to the axis of rotation of the workpiece in the machine tool.

Thus, the present invention provides an automatic workpiece loader and unloader for use in conjunction with a machine tool to load and unload successive workpieces in the machine tool to minimize idle machine time and maximize machine tool utilization.

It is to be understood that the preferred embodiment of the present invention described herein is intended to be illustrative only and not limiting in any manner as the invention is limited only by the scope of the appended claims.

What is claimed is:

1. An automatic workpiece loader and unloader for use in conjunction with a machine tool adapted to perform a machining operation on a series of workpieces while each workpiece is rotated about the same workpiece axis comprising:
   a workpiece loader assembly and a workpiece unloader assembly;
   said loader and unloader assemblies being mounted on a carriage adapted to reciprocate along a guide rail between a first position over said machine tool and a second position over a workpiece conveyor apparatus;
   each said loader and unloader assembly including a single selectively openable and closable workpiece grasping means to grasp and retain a workpiece therein;
   means associated with each said workpiece grasping means for opening and closing said grasping means;
   said loader workpiece grasping means being extensible from and retractable toward said carriage along a first path of movement;
   said unloader workpiece grasping means being extensible from and retractable toward said carriage along a second path of movement angularly disposed with respect to said first path of movement and intersecting said first path of movement of said loader workpiece grasping means at a level corresponding to the level at which said workpiece is operatively engaged in and rotated by said machine tool and at a level at which said workpiece is conveyed by said conveying apparatus;
   said first and second paths of movement being disposed in a plane also including the workpiece axis; and
   means operatively associated with each said loader and unloader assembly for extending and retracting each said workpiece grasping means, thereby to effectuate the transfer of a workpiece to be machined from said conveyor apparatus to said machine tool and the transfer of a machined workpiece from said machine tool to said conveyor apparatus as said carriage is reciprocated between said first and second positions.

2. A workpiece loader and unloader as defined in claim 1 wherein each said loader and unloader assembly comprises:
   a frame support rigidly mounted on said carriage;
   a slide member slidably disposed on said frame support;
   said single workpiece grasping means and said means for opening and closing said grasping means being fixed to one end of said slide member; and
   said means for extending and retracting said workpiece grasping means being mounted on said frame support and interconnected to said slide member thereby to reciprocably slide said slide member and said workpiece grasping means relative to said frame support.

3. An automatic workpiece loader and unloader adapted for use in conjunction with a machine tool to automatically load and unload workpieces into and from said machine tool for rotation about a given predetermined axis of rotation comprising:
   a horizontally movable carriage;
   a workpiece loader means and a workpiece unloader means mounted on said carriage;
   said workpiece loader and unloader means each including a single selectively openable and closable workpiece grasping means adapted to pen about, grasp and retain a workpiece therein;
   one of said workpiece grasping means being reciprocably mounted on said carriage to be extensible and retractable along a first path of movement substantially perpendicular to the given predetermined axis of rotation;
   the other of said workpiece grasping means being reciprocably mounted on said carriage to be extensible and retractable along an angularly disposed second path of movement within a plane determined by the given predetermined axis of rotation and by the first path of movement;
   said substantially perpendicular path of movement and said angularly disposed path of movement being oriented so that the first and second paths of movement intersect at a level corresponding to the level in said machine tool at which a workpiece is supported therein during a machining operation,
   means mounted on said carriage to selectively and reciprocably move each said workpiece grasping means along the respective paths of movement;

means operatively associated with each said workpiece grasping means to open and close said grasping means about a workpiece;

said unloader workpiece grasping means being adapted to extend and grasp a workpiece upon which a machining operation has been completed from said machine tool and retract while retaining said machined workpiece and said loader grasping means is adapted to extend while grasping a workpiece upon which a machining operation is to be done to deposit and unmachined workpiece in said machine tool.

4. A workpiece loader and unloader as defined in claim 3 wherein said carriage is reciprocable between a first position over a load and unload station in said machine tool and a second position over a workpiece conveying apparatus adapted to convey a series of workpieces at a level corresponding to said level at which said workpieces are supported in said machine tool, said loader workpiece grasping means being adapted to extend and grasp a workpiece upon which a machining operation is to be done from said conveying apparatus and retract while retaining said unmachined workpiece and said unloader workpiece grasping means being adapted to extend while grasping a machined workpiece to deposit said machined workpiece on said conveying apparatus both while said carriage is in said second position.

* * * * *